(12) United States Patent
Yu

(10) Patent No.: US 10,561,072 B2
(45) Date of Patent: Feb. 18, 2020

(54) PLANT CULTIVATING CONTAINER

(71) Applicant: AQUALEAN MANUFACTURING ASSOCIATES CO., LTD., Taipei (TW)

(72) Inventor: Pin-Hsien Yu, Taipei (TW)

(73) Assignee: AQUALEAN MANUFACTURING ASSOCIATES CO., LTD., Taipei (TW)

( * ) Notice: Subject to any disclaimer, the term of this patent is extended or adjusted under 35 U.S.C. 154(b) by 281 days.

(21) Appl. No.: 15/811,228

(22) Filed: Nov. 13, 2017

(65) Prior Publication Data
US 2019/0141906 A1   May 16, 2019

(51) Int. Cl.
*A01G 27/00* (2006.01)
*A01G 9/02* (2018.01)
*G01F 23/76* (2006.01)

(52) U.S. Cl.
CPC ............. *A01G 9/02* (2013.01); *A01G 27/006* (2013.01); *A01G 27/008* (2013.01); *G01F 23/76* (2013.01)

(58) Field of Classification Search
CPC .......... A01G 9/02; A01G 9/028; A01G 27/00; A01G 27/008
USPC .................................. 47/48.5, 65.5, 66.1, 79
See application file for complete search history.

(56) References Cited

U.S. PATENT DOCUMENTS

| | | | | |
|---|---|---|---|---|
| 3,739,524 A * | 6/1973 | Rose | ...................... | A01G 27/04 47/81 |
| 4,171,593 A * | 10/1979 | Bigglestone | ........... | A01G 27/04 47/79 |
| 4,223,837 A * | 9/1980 | Gubbiotti | ............. | A01G 27/008 137/152 |
| 4,270,309 A * | 6/1981 | Baumann | ............. | A01G 27/008 47/59 R |
| 4,993,186 A * | 2/1991 | Immonen | ............... | A01G 27/04 47/48.5 |
| 5,921,025 A * | 7/1999 | Smith | .................... | A01G 27/06 47/48.5 |
| 6,276,090 B1 * | 8/2001 | Lai | ......................... | A01G 27/06 47/79 |
| 9,872,446 B2 * | 1/2018 | Tchira | .................. | A01G 27/008 |
| 2009/0223124 A1 * | 9/2009 | Pasquariello | ........... | A01G 27/04 47/66.1 |
| 2009/0313892 A1 * | 12/2009 | Hashimoto | ............. | A01G 27/02 47/79 |
| 2010/0064581 A1 * | 3/2010 | Johnson | ............... | A01G 25/167 47/79 |
| 2013/0318872 A1 * | 12/2013 | van der Starre | ......... | A01G 9/02 47/66.6 |

(Continued)

*Primary Examiner* — David J Parsley
*Assistant Examiner* — Danielle A Clerkley
(74) *Attorney, Agent, or Firm* — Egbert Law Offices, PLLC

(57) ABSTRACT

A plant cultivating container includes an outer cup, an inner cup received in the outer cup, wherein the inner cup is provided for cultivating plant(s). A floating plate is movably disposed between the bottoms of the outer cup and the inner cup and a follower is mounted to the floating plate, wherein the floating plate is reciprocally moved relative to the outer due to a water level in the outer cup. At least one window is defined in the outer cup and the follower is formed with a shutter, wherein a relative action is formed between the shutter and the at least one window for providing a continual visual effect.

9 Claims, 15 Drawing Sheets

(56) References Cited

U.S. PATENT DOCUMENTS

2015/0000190 A1* 1/2015 Gibbons .............. A01G 27/005
                                                    47/66.6
2018/0228100 A1* 8/2018 Gergek ................ A01G 27/003

* cited by examiner

PLANT CULTIVATING CONTAINER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to container, and more particularly to a plant cultivating container.

2. Description of Related Art Including Information Disclosed Under 37 CFR 1.97 and 37 CFR 1.98

Plant cultivation is a hobby for somebody to contribute to his/her peace of mind or inner tranquility, especially to a small plant on a desk in the office or on a coffee table in the living room because these small plants are easily cared and does not need to be often pruned. Consequently, the cultivator only needs to regularly water the cultivated plant(s) such that regularly watering is very important to the cultivated plant(s). As a result, the conventional plant cultivating container usually provides a water level indicating function for reminding the cultivator to water the cultivated plant(s).

However, the conventional water level indicating device of the plant cultivating container focuses on the function and ignores the structures thereof. As a result, the indicating modes of the conventional water level indicating devices are dull and dry. The floating structure and the indicating structure of the conventional plant cultivating container need to be advantageously altered.

The present invention has arisen to mitigate and/or obviate the disadvantages of the conventional plant cultivating containers.

BRIEF SUMMARY OF THE INVENTION

The main objective of the present invention is to provide an improved plant cultivating container that provides a continual visual effect when the water level is continually changed.

To achieve the objective, the plant cultivating container in accordance with the present invention comprises an outer cup including at least one window defined therein and an inner cup mounted into outer cup for cultivating plant(s). The inner cup includes an insertion centrally extending from a bottom thereof such that a receiving space is defined between the outer cup and the inner cup, wherein the receiving space is ring-shaped. A floating plate is received in the receiving space, wherein the floating plate is reciprocally moved relative to the outer cup due to a water level in the receiving space. A follower is mounted to the floating plate. The follower is formed with a shutter disposed between the outer cup and the inner cup and corresponding to the at least one window. The follower includes a connector laterally mounted to the floating plate and a connecting bar extending from the connector, wherein the shutter is connected to a free end the connecting bar.

Further benefits and advantages of the present invention will become apparent after a careful reading of the detailed description with appropriate reference to the accompanying drawings.

DETAILED DESCRIPTION OF THE INVENTION

Figure 1:
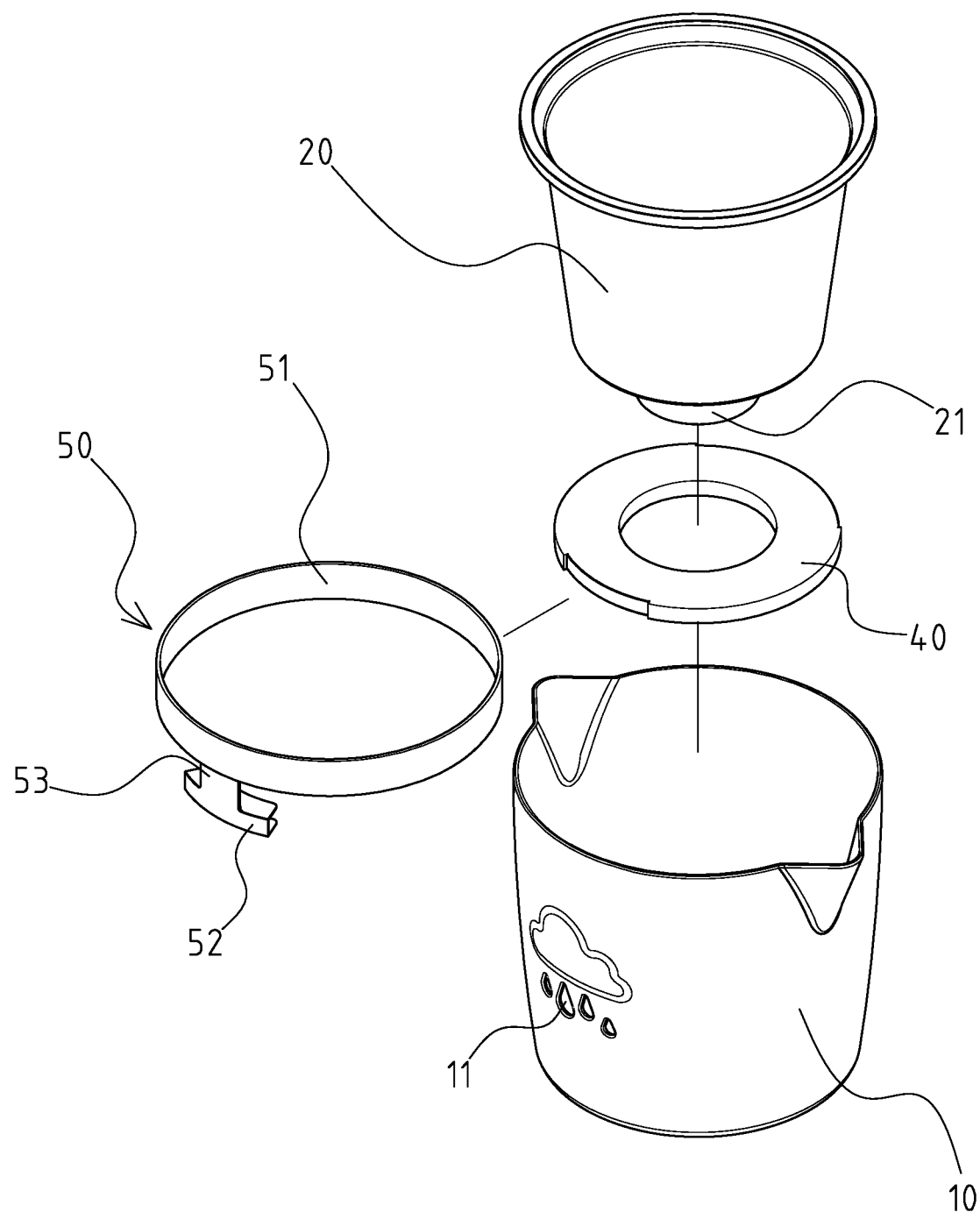
FIG. 1 is an exploded perspective view of a plant cultivating container in accordance with the present invention.
Figure 2:
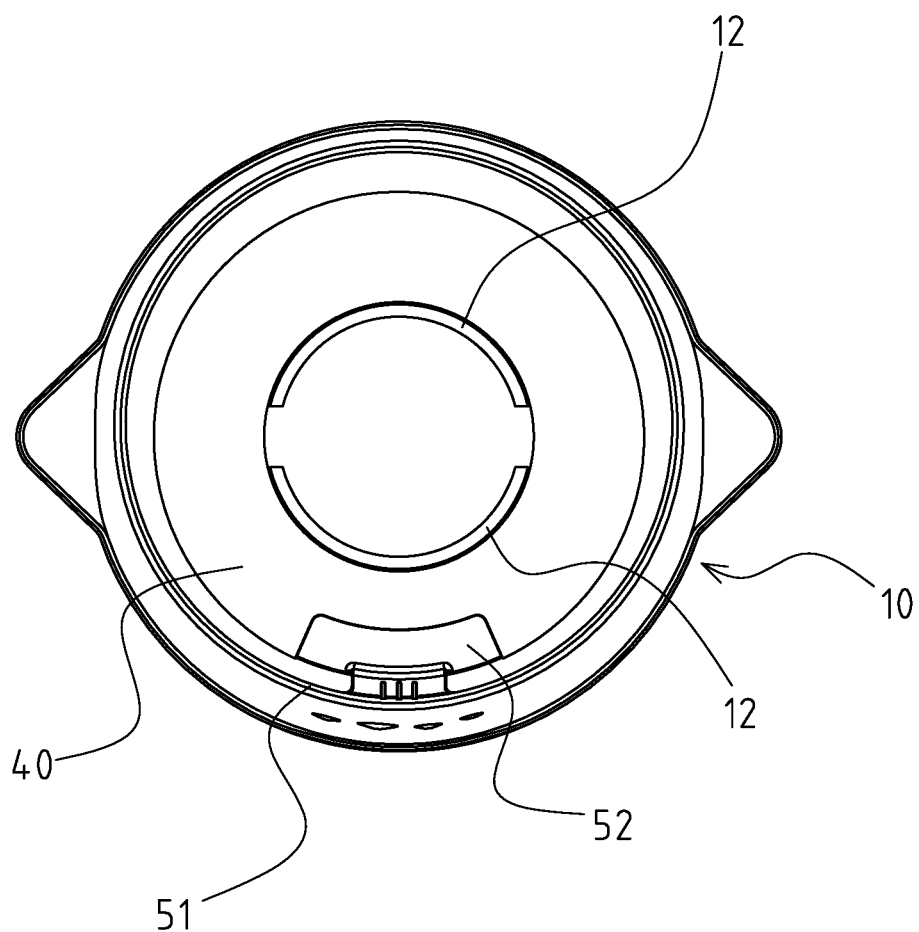
FIG. 2 is a top plan view of the plant cultivating container in accordance with the present invention when removing the inner cup.
Figure 2A:
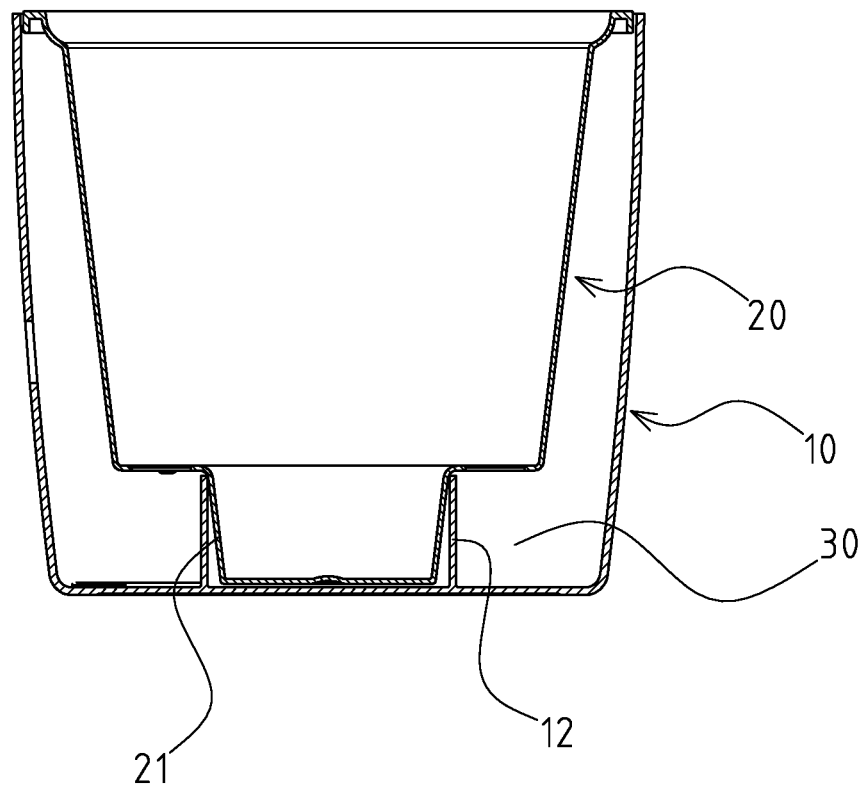
FIG. 2A is a cross-sectional view of the outer cup and the inner cup of the plant cultivating container in accordance with the present invention.

Referring to the drawings and initially to FIGS. 1 and 2A, a plant cultivating container in accordance with the present invention comprises an outer cup 10, an inner cup 20 mounted into the outer cup 10 and a receiving space 30 is defined between bottoms of the outer cup 10 and the inner cup 20, wherein the inner cup 20 is provided for cultivating plant(s). A floating plate 40 is movably received in the receiving space 30 and a follower 50 is mounted to the floating plate 40.

Further with reference to FIG. 2, the outer cup 10 has at least one window 11 peripherally defined therein and multiple C-shaped structures 12 perpendicularly extending from a bottom thereof, wherein the multiple C-shaped structures 12 respectively correspond to an axis of the outer cup 10. In the preferred embodiment of the present invention, the at least one window 11 is tear-shaped.

The inner cup 20 includes an insertion 21 centrally extending from a bottom thereof and situated within the multiple C-shaped structures 12 such that the receiving space 30 is defined as a ring.

The floating plate 40 surrounds the multiple C-shaped structures 12 and reciprocally moved relative to the multiple C-shaped structures 12 due to a water level in the receiving space 30.

The follower 50 is formed with a shutter 51 disposed between the outer cup 10 and the outer cup 20, wherein the shutter 51 is moved with the floating plate 40 and selectively cover the at least one window 11 and the covering area of the at least one window is directly proportional to the water level in the receiving space 30. The follower 50 includes a connector 52 laterally mounted to the floating plate 40 and a connecting bar 53 extending from the connector 52, wherein the shutter 51 is connected to a free end of the connecting bar 53 and disposed between the outer cup 10 and the inner cup 20. In the preferred embodiment of the present invention, the shutter 51 is a ring structure such that the shutter 51 always operated with the at least one window 11 even the floating plate 40 is rotated relative to the multiple C-shaped structures 12.

Figure 3:
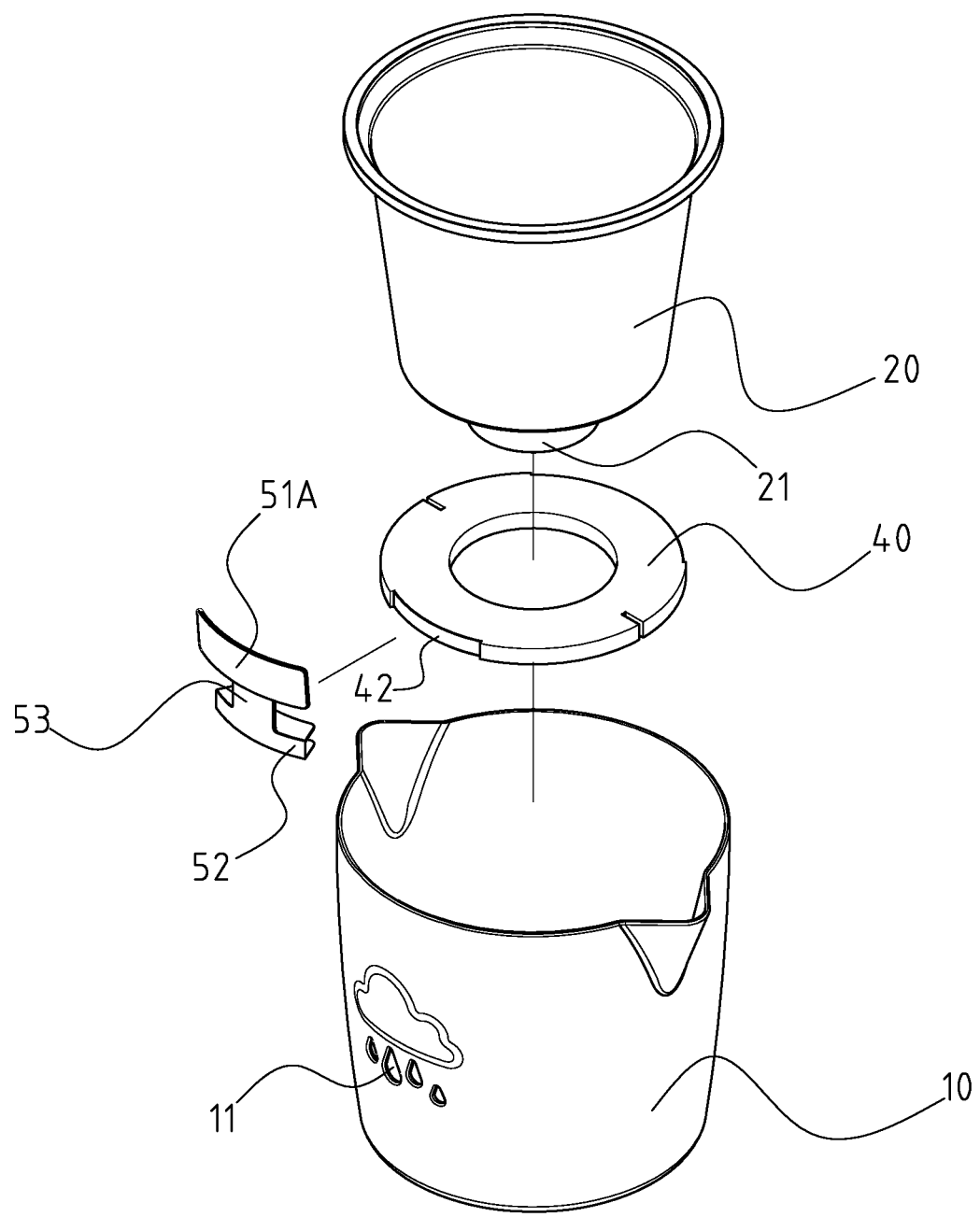
FIG. 3 is an exploded perspective view of a second embodiment of the plant cultivating container in accordance with the present invention.
Figure 4:
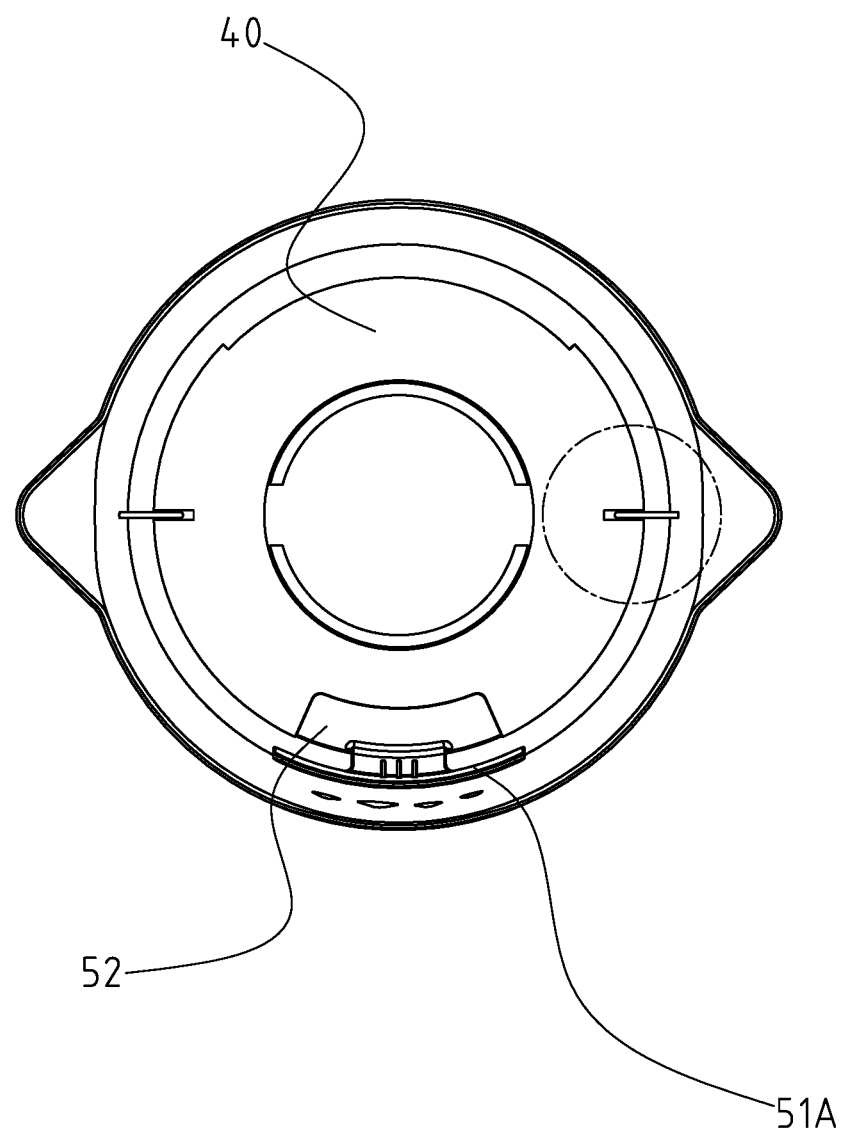
FIG. 4 is a top plan view of the second embodiment of the plant cultivating container in accordance with the present invention when removing the inner cup.
Figure 4A:
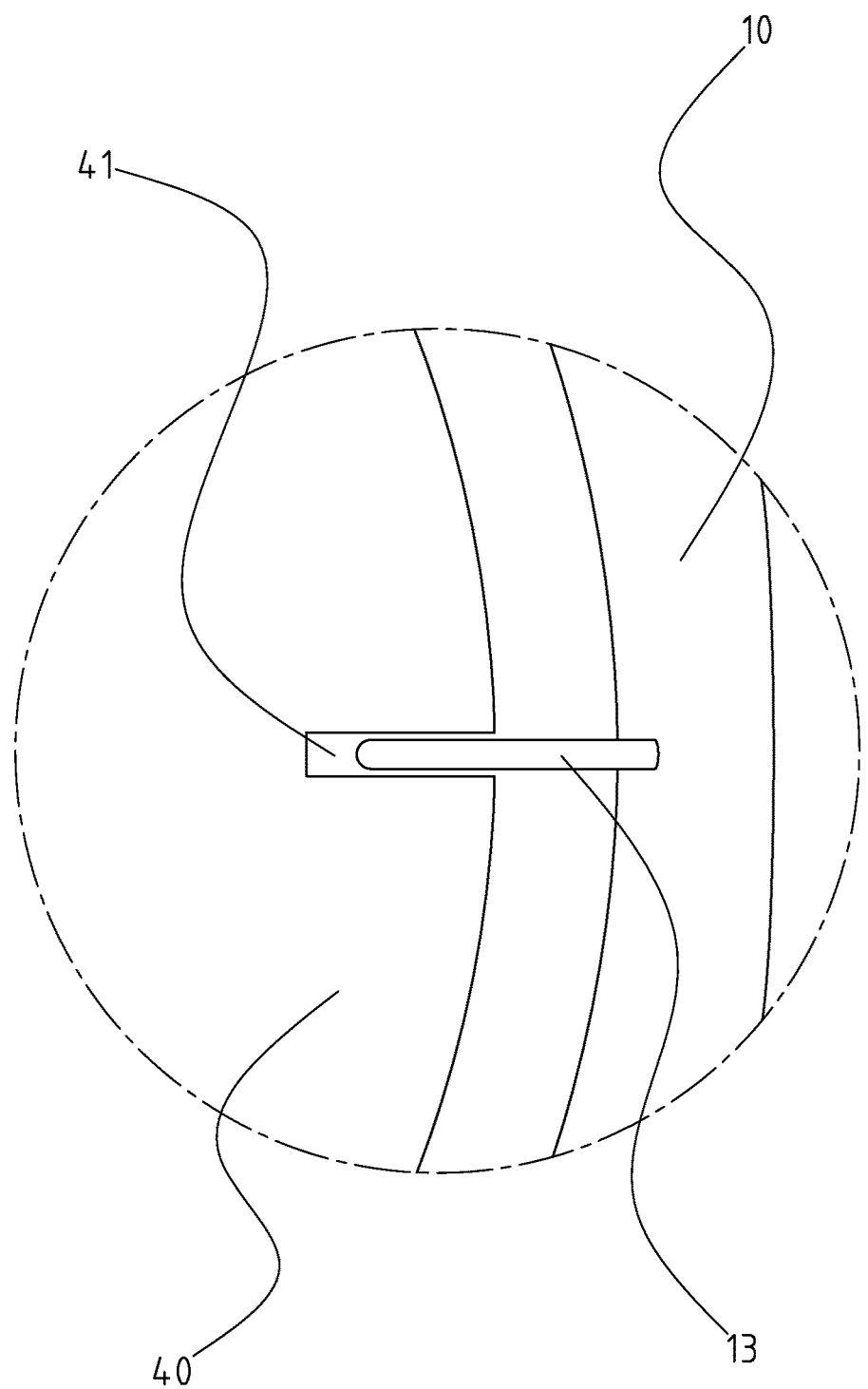
FIG. 4A is a partially enlarged view of FIG. 4.

With reference to FIGS. 3, 4 and 4A that show a second embodiment of the plant cultivating container in accordance with the present invention, in the embodiment, the outer cup 10 includes at least one protrusion 13 extending from an inner periphery thereof. The floating plate 40 includes at least one indentation 41 radially defined therein, wherein the at least one protrusion 13 is received in the at least one indentation 41 such that the floating plate 40 is not rotatable relative to the outer cup 10. In the preferred embodiment of the present invention, the shutter 51A is C-shaped because the floating plate 40 is not rotatable relative to the outer cup 10. In addition, the floating plate 40 includes a check groove 42 laterally defined therein, wherein the connector 52 is partially received in the check groove 42 such that the shutter 51A directly corresponds to the at least one window 11 after the follower 50 being mounted to the floating plate 40.

Figure 5:
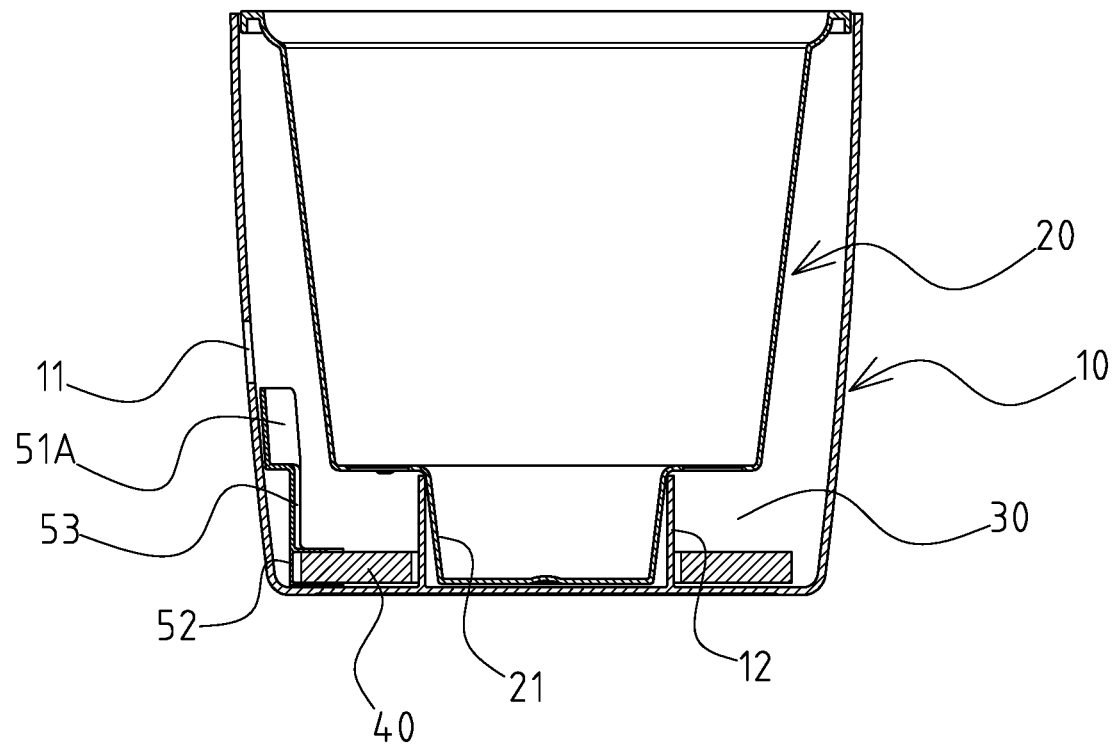
FIG. 5 is a cross-sectional view of the second embodiment of the plant cultivating container in accordance with the present invention when the cuter cup containing no water.
Figure 6:
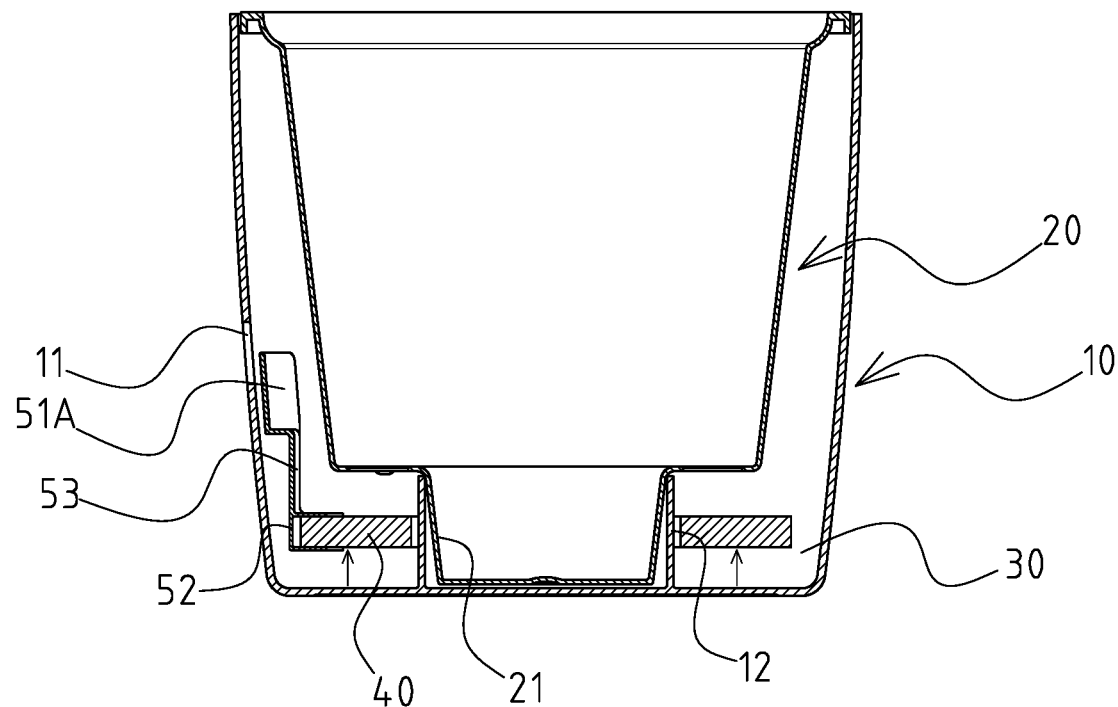
FIG. 6 is a cross-sectional view of the second embodiment of the plant cultivating container in accordance with the present invention for showing the movement of the floating plate and the follower.
Figure 7:
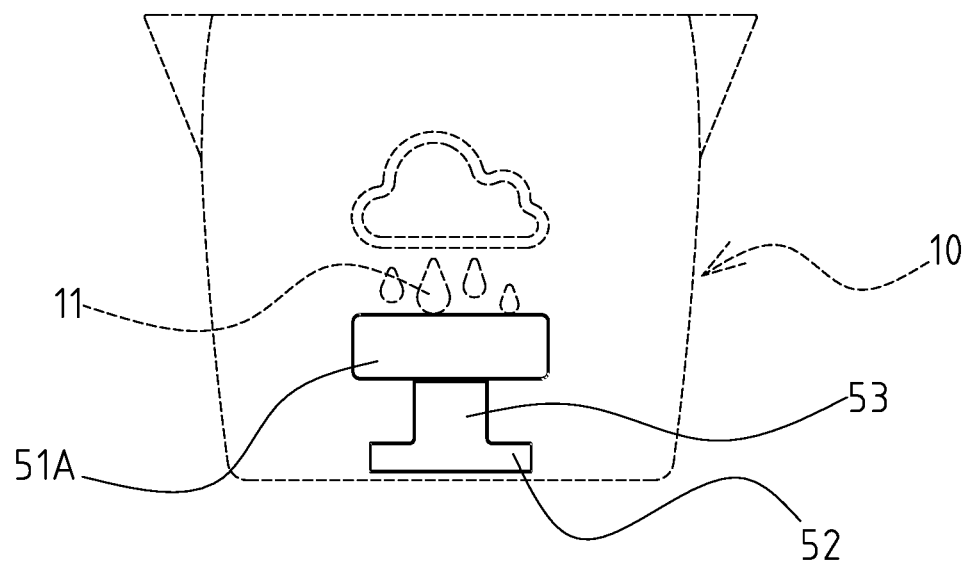
FIGS. 7 and 8 are schematic views of the second embodiment of the plant cultivating container in accordance with the present invention for showing the relative movement of the shutter and the at least one through hole in the outer cup.

With reference to FIGS. 5 and 7, as to the second embodiment of the present invention, the floating plate 40 abuts the bottom of the outer cup 10 and the shutter 51A is situated below the at least one window 11 when there is no water in the receiving space 30. Further with reference to FIG. 6, when slowly adding water into the outer cup 10, the floating plate 40 and the follower 50 is slowly upwardly moved relative to the outer cup 10 due to the water level in the receiving space 30.

Figure 8:
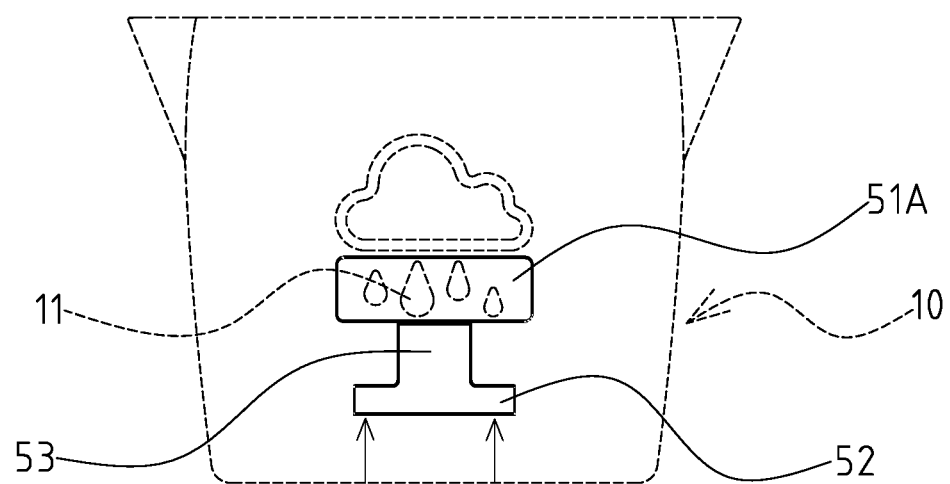
Figure 9:
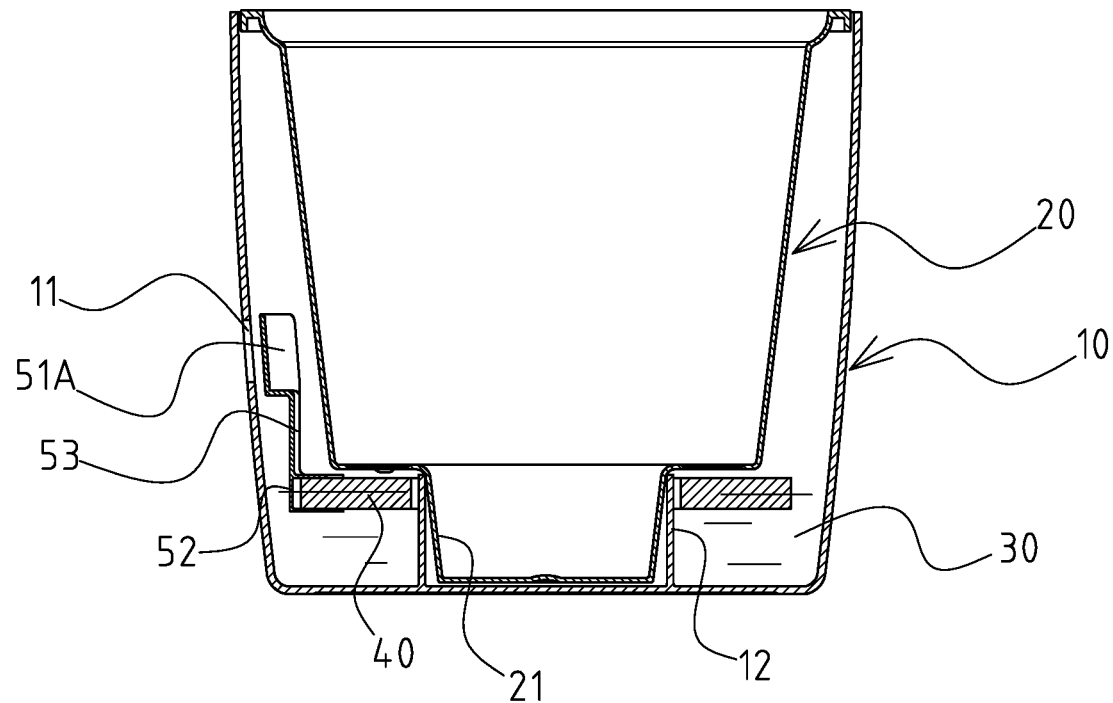
FIG. 9 is a cross-sectional view of the second embodiment of the plant cultivating container in accordance with the present invention when the floating plate and the follower is lifted due to the water in the receiving space.

Consequently, the shutter 51A gradually covers the at least one window 11 for showing the water level in the outer cup 10 is gradually risen during the floating plate 40 being upwardly moved relative to the outer cup 10. In the preferred embodiment, the outer cup 10 has multiple tear-shaped windows 11 defined therein and a cloud pattern formed above the multiple tear-shaped windows 11 for providing an imagery of rain and reminding that the water is temporarily unnecessary to the plant cultivated in the inner cup 20, as shown FIGS. 8 and 9, when the shutter 51A completely cover the at least one window 11 and the receiving space has a full pool level. The shutter 51A is downward moved with the floating plate 40 to a relative low point when the water in receiving space is absorbed by the plant or evaporated. Consequently, the imagery of rain is disappeared and the disappeared imagery of rain reminds that the plant needs to be watered.

Figure 10:
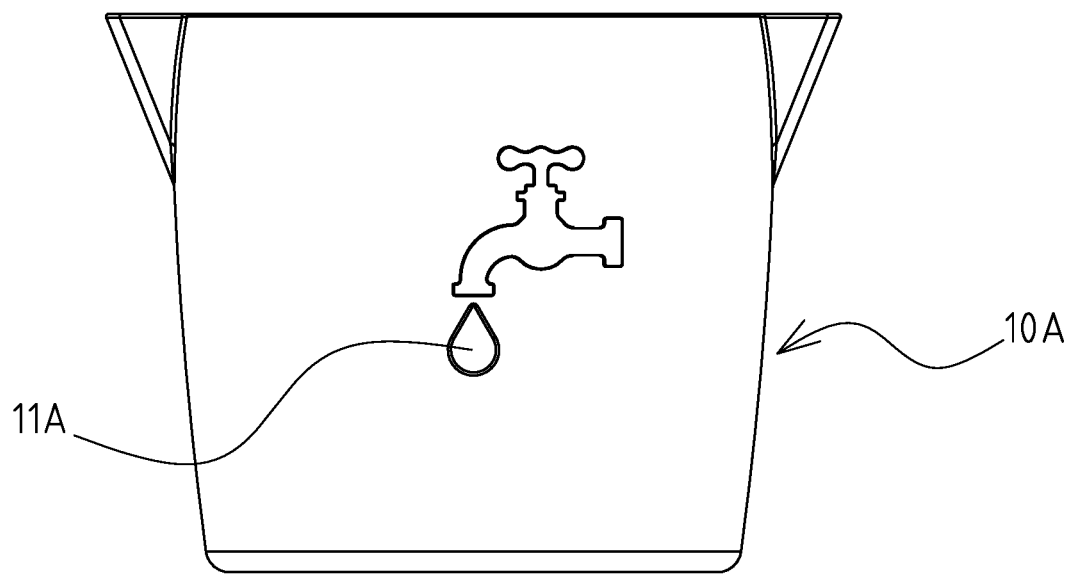
FIG. 10 is a front plan view of a third embodiment of the plant cultivating container in accordance with the present invention.

With reference to FIG. 10 that shows a third preferred embodiment of the present invention, the structures and the operating method of the third embodiment are the same as the second preferred embodiment as described above. The difference between the second preferred embodiment and the third embodiment is the outward appearance of the outer cup 10A. In this embodiment, the outer cup 10A has only one tear-shaped window 11A and is formed with a pattern of faucet above the tear-shaped window 11A for providing an imagery of a plenty of water from the faucet and reminding that the water is temporarily unnecessary to the plant cultivated in the inner cup 20, as shown FIG. 10, the shutter 51A completely cover the window 11A when the receiving space has a full pool level. The shutter 51A is downward moved with the floating plate 40 to a relative low point when the water in receiving space is absorbed by the plant or evaporated. Consequently, the imagery of a plenty of water from the faucet is disappeared and the disappeared imagery of a plenty of water from the faucet reminds that the plant needs to be watered.

Figure 11:
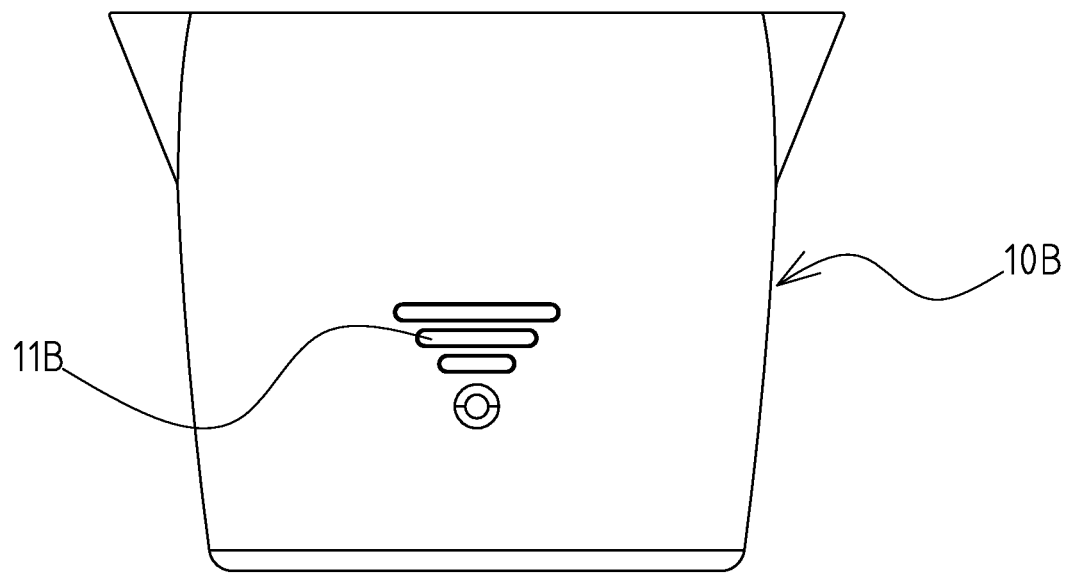
FIG. 11 is a front plan view of a fourth embodiment of the plant cultivating container in accordance with the present invention.

With reference to FIG. 11 that shows a fourth preferred embodiment of the present invention, the structures and the operating method of the fourth embodiment are the same as the second preferred embodiment as described above. The difference between the second preferred embodiment and the third embodiment is the outward appearance of the outer cup 10B. In this embodiment, the outer cup 10A defines multiple windows 11B that are parallel grooves and has a length gradually shorted relative to the bottom of the outer cup 10B. The multiple windows 10B, in this embodiment, provides an imagery of a great signal strength for Wi-Fi or cell phone and reminding that the water is temporarily unnecessary to the plant cultivated in the inner cup 20, as shown FIG. 11, the shutter 51A completely cover the window 11A when the receiving space has a full pool level. The shutter 51A is downward moved with the floating plate 40 to a relative low point when the water in receiving space is absorbed by the plant or evaporated. Consequently, the imagery of the great signal strength is disappeared and the disappeared imagery of the great signal strength reminds that the plant needs to be watered.

Figure 12:
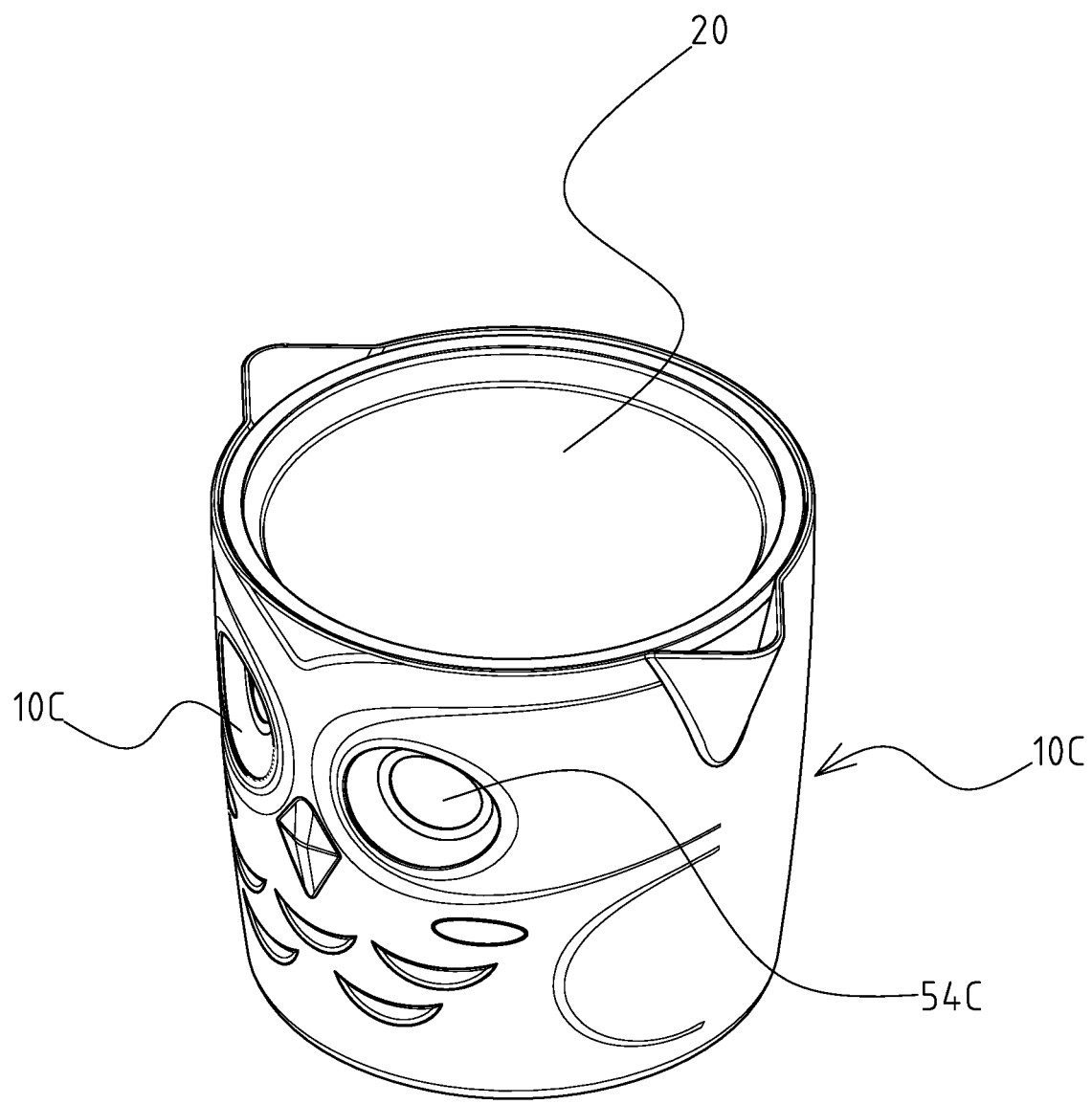
FIG. 12 is a front plan view of a fifth embodiment of the plant cultivating container in accordance with the present invention.
Figure 13:
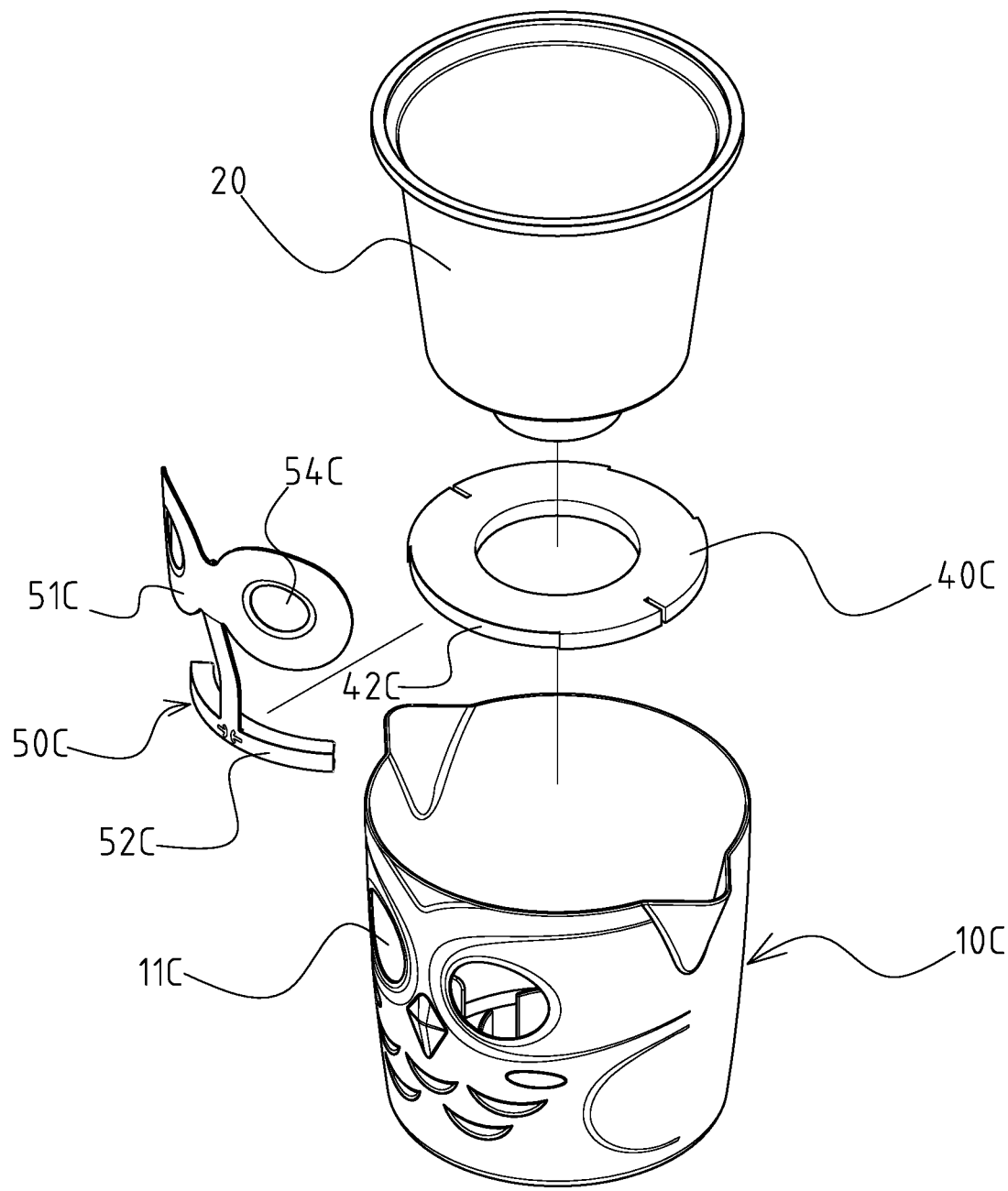
FIG. 13 is an exploded perspective view of the fifth embodiment of the plant cultivating container in accordance with the present invention.

With reference to FIGS. 12 and 13 that show a fifth preferred embodiment of the present invention, the structures and the operating method of the fifth embodiment are similar to the second preferred embodiment as described above. The difference between the second preferred embodiment and the fifth embodiment is described hereinafter. The outer periphery of the outer cup 10C is facially modeled and the at least one window 11C is used as at least one orbit relative to the facially modeled outer cup 10C. The shutter 51C is formed with at least vision area 54C, wherein the at least one vision area 54C selectively corresponds to the at least one windows 11C and is used as at least one eyeball relative to the at least one window 11C. In this embodiment, the at least one vision area 54C is non-penetrating and a color difference is formed between the shutter 51C and the vision area 54C and the at least one vision 54C has a color darker than that of the shutter 51C. However, the at least one vision area 54C can also be at least one through hole that selectively communicates with the at least one window 51C such that the operator selectively sees the outer periphery of the inner cup 20 via the communicated at least one window 51C and the at least one vision area 54C. In addition, the floating plate 40C includes a check groove 42C laterally defined therein, wherein the connector 52C of the follower 50C is partially received in the check groove 42C such that the at least one vision area 54C directly corresponds to the at least one window 11C after the follower 50C being mounted to the floating plate 40C.

Figure 14:
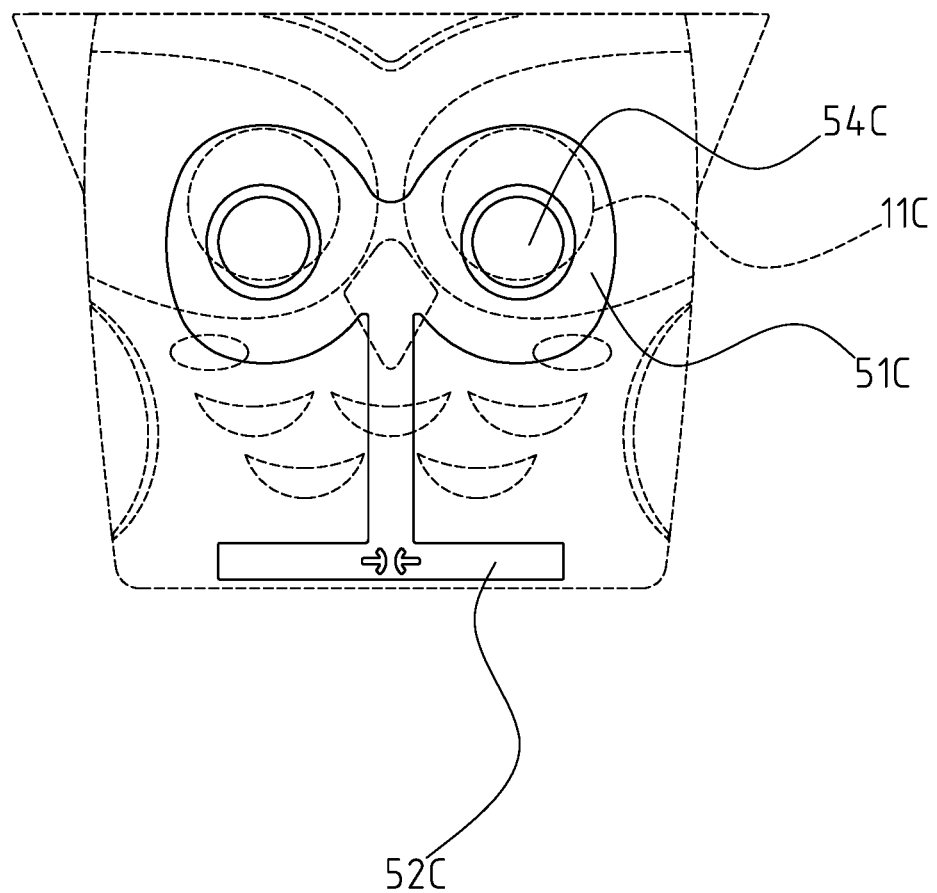
FIGS. 14 and 15 are operational views of the fifth embodiment of the plant cultivating container in accordance with the present invention.
Figure 15:
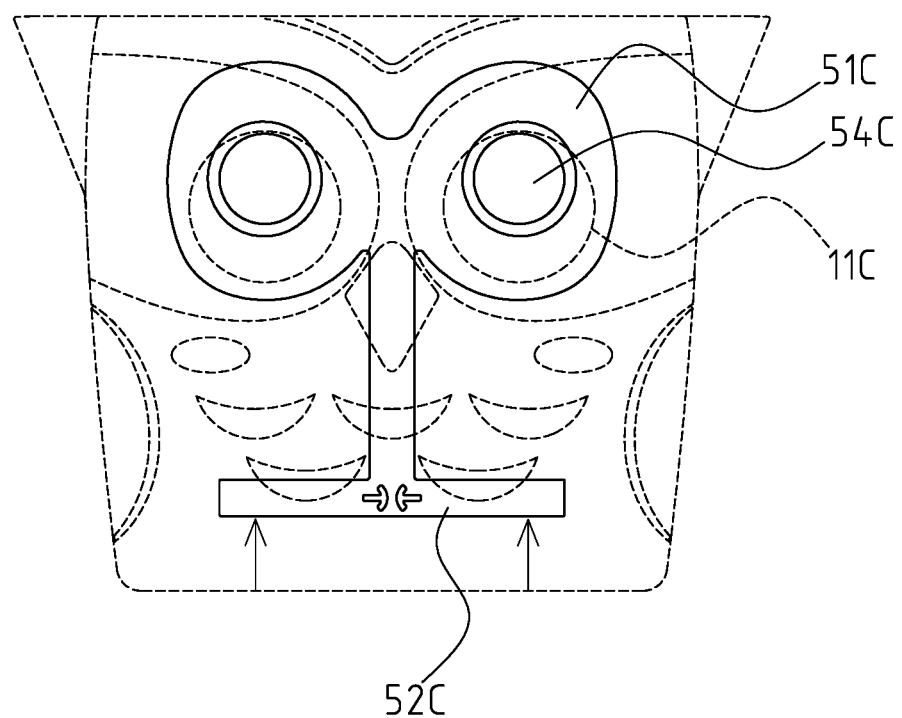

With reference to FIG. 14, the floating plate 40C abuts the bottom of the outer cup 10C and the vision area 54C is situated a relative low point relative to the at least one window 11C when there is no water in the outer cup 10C such that the facially modeled outer periphery of the outer cup 10C shows a cheerlessly facial expression because the eyeball is drooped. With reference to FIG. 15, when water slowly is added into the outer cup 10C and the water level in the outer cup 10C is the gradually risen, the floating plate 40C and the follower 50C are slowly upwardly moved relative to the outer cup 10C due to the water level in the outer cup 10C, and the at least one vision area 54C, used as at least one eyeball, is gradually upwardly moved relative to the at least one window 11C, used as at least one orbit. Consequently, the facially modeled outer periphery of the outer cup 10C provides a continual visual effect showing the facially modeled outer periphery of the outer cup 10C is gradually waked and reminding that the water is temporarily unnecessary to the plant cultivated in the inner cup 20. The vision area 54C is downward moved with the floating plate 40C to the original relative low point when the water in the outer cup 10C is absorbed by the plant or evaporated and shows the original cheerlessly facial expression that reminds the plant what needs to be watered.

Although the invention has been explained in relation to its preferred embodiment, it is to be understood that many other possible modifications and variations can be made without departing from the spirit and scope of the invention as hereinafter claimed.

I claim:

1. A plant cultivating container comprising:
   an outer cup having at least one window defined therein;
   an inner cup mounted into said outer cup, said inner cup having an insertion centrally extending from a bottom thereof such that a receiving space is defined between said outer cup and said inner cup, wherein the receiving space is ring-shaped;
   a floating plate received in the receiving space, wherein said floating plate is reciprocally movable relative to said outer cup in relation to a water level in the receiving space; and
   a follower mounted to said floating plate, said follower formed with a shutter disposed between said outer cup and said inner cup and corresponding to the at least one window, said follower having a connector laterally mounted to said floating plate and a connecting bar extending from the connector, wherein the shutter is connected to a free end of the connecting bar, wherein said outer cup has at least one protrusion extending from an inner periphery thereof and said floating plate has at least one indentation radially defined therein, the at least one protrusion being received in the at least one indentation such that said floating plate is not rotatable relative to said outer cup.

2. The plant cultivating container of claim 1, wherein the shutter is moved with the floating plate and selectively cover the at least one window and the covering area of the at least one window is directly proportional to the water level in the receiving space.

3. The plant cultivating container of claim 1, wherein the shutter is a ring structure.

4. The plant cultivating container of claim 2, wherein the shutter is a ring structure.

5. The plant cultivating container of claim 1, wherein the shutter is C-shaped and wherein the floating plate has a check groove laterally defined therein, and wherein the connector is partially received in the check groove such that the shutter directly corresponds to the at least one window after said follower is mounted to said floating plate.

6. The plant cultivating container of claim 5, wherein an outer periphery of said outer cup is facially modeled and the at least one window has at least one orbit relative to the facially modeled outer cup, the shutter being formed with at least one vision area, wherein the at least one vision area selectively corresponds to the at least one window.

7. The plant cultivating container of claim 6, wherein the at least one vision area is non-penetrating and a color difference is formed between the shutter and the at least one vision area, wherein the at least one vision area has a color darker than that of a color of the shutter.

8. The plant cultivating container of claim 6, wherein the at least one vision area is at least one through hole that selectively communicates with the at least one window such that an operator can selectively see an outer periphery of said inner cup via the communicated at least one window and the at least one vision area.

9. The plant cultivating container of claim 5, wherein said outer cup has multiple C-shaped structures perpendicularly extending from a bottom thereof and respectively corresponding to an axis of said outer cup, said inner cup being positioned within the multiple C-shaped structures.

* * * * *